United States Patent [19]

Lender

[11] 4,112,263

[45] Sep. 5, 1978

[54] MODIFIED DUOBINARY REGENERATIVE REPEATER TESTING ARRANGEMENT

[75] Inventor: Adam Lender, Palo Alto, Calif.

[73] Assignee: GTE Automatic Electric Laboratories Incorporated, Northlake, Ill.

[21] Appl. No.: 785,132

[22] Filed: Apr. 6, 1977

[51] Int. Cl.² .......................... H04B 3/46; H04B 1/60
[52] U.S. Cl. ........................................... 179/175.31 R
[58] Field of Search .............. 179/175.31 R, 175.3 R, 179/170 F, 15 BF; 340/146.1 R, 146.1 E

[56] References Cited

U.S. PATENT DOCUMENTS

| | | | |
|---|---|---|---|
| 3,062,927 | 11/1962 | Hamori | 179/175.31 R |
| 3,083,270 | 3/1963 | Mayo | 179/175.31 R |
| 3,842,220 | 10/1974 | Arras | 179/175.31 R |
| 3,950,622 | 4/1976 | Taylor | 179/175.31 R |

*Primary Examiner*—Douglas W. Olms
*Attorney, Agent, or Firm*—Leonard R. Cool; Russell A. Cannon

[57] ABSTRACT

Modified duobinary regenerative repeaters are tested in situ by means of a pulse pattern generator connected to the repeatered span line, a plurality of audio filters, one at each repeater site, a return transmission path and a measuring device for determining the character of the signal output from a selected repeater.

10 Claims, 6 Drawing Figures

MODIFIED DUOBINARY REGENERATIVE REPEATER TESTING ARRANGEMENT

BACKGROUND OF THE INVENTION

1. Field of the Invention

This invention relates to a digital communication system involving unattended regenerative repeaters and, more particularly, to means for locating a faulty or inoperative one of a plurality of unattended pulse regenerative repeaters which are connected in tandem over a transmission path.

2. Description of the Prior Art

Prior art techniques for testing of tandem regenerative repeaters were directed to those carrier systems such as the T1 which employ return-to-zero bipolar coded pulses. The T1 carrier system employs pulse code modulation in which the digital signal is converted into a bipolar coded signal. A bipolar coded signal is generated from a unipolar (binary) signal by coding binary "0's" into a center level (absence of pulses), and binary "1's" into top or bottom levels in such a manner that every other "1" is inverted. Thus, two successive 1's have opposite polarity as shown below where a unipolar signal is converted to a bipolar code.

Unipolar (Binary): 000111100101001000111
Bipolar Code: 000+−+−00+0−00+0−000+−+

A fault-locating test set is used to determine which repeater, in a plurality of repeaters in tandem, is faulty, by sending a special signal which contains both violations of the bipolar code and an audio frequency in its spectrum. This special signal consists of a 3-digit code — triplets — generated periodically. This special signal can be regarded as the algebraic sum of two pulse trains: (1) a bipolar coded signal and, (2) a unipolar (binary) signal as follows:

Bipolar Code:
+−00000+−00000+−00000+−00000
Unipolar: 00+000000+000000+000000+0000
Special Signal:
+−+0000+−+0000+−+0000+−+0000

The unipolar pulse train in the special signal (sum of bipolar and unipolar) represents interference as it causes violations of the bipolar code.

This may be seen by referring again to the special signal shown above. Notice that in the special signal (periodic pulse train) there are always two successive positive pulses +0000+. This is violation of bipolar pattern. These unipolar pulses reduce the crosstalk margin of the bipolar repeater that is designed to pass and regenerate a bipolar coded pulse train. The frequency of occurrence of a triplet may be regulated by the number of 0's which are permitted between repetitions of the triplet. It is apparent that this also changes the density of the special signal. As long as the density of the special signal is low, an operative repeater will accurately reproduce the special signal. Let us now explain what we mean by low density. Reverting back to the special signal, note that the triplets, +−+ (positive, negative, positive pulse) are followed by a string of 0's. The lowest density is when there is one triplet (+−+) per 11 pulse positions; that is each triplet is followed by 8 zeros. Such a density constitutes only small amount of interference. As the density is gradually increased from the 3 (one triplet) out of 11 (total time slots) to 3 out of 10, then 3 out of 9 up to the highest density of 3 out of 4, interference, due to the effect of the unipolar addition to form the special signal, also increases gradually. Thus, the minimum density includes 1 unipolar pulse in 11 time slots, and the maximum density includes 1 unipolar pulse in 4 time slots. At the same time this special signal is switched at an audio rate. This audio frequency corresponds to the frequency assigned to each repeater location. A different audio filter is employed at each repeater location, and the filter is used to extract the sine wave corresponding to the switched audio rate.

As the triplet density is increased, at some point, the repeater under test will start making errors, being unable to reproduce faithfully the triplet pulses. When such errors are made the amplitude of sine wave output of the audio filter, corresponding to repeater location, will be smaller as compared to the amplitude of this sine wave when there are no errors and pulse density is low. The pulse density corresponding to the smaller amplitude of the received sine wave determines repeater margin to noise. A fault-locating test set generates the triplet for transmission, compares the audio tone returned from the repeater to the locally-generated audio tone at the same frequency. The lowest pulse density at which the difference between the locally-generated audio tone and the received audio tone exceeds a predetermined value is the measure of margin. Clearly, repeaters must be tested in the direction of pulse transmission in the order of their location. First, the nearest repeater is tested. If it operates properly, then the next repeater location is selected and so on. For each test, the fault-locating test set is first calibrated. Lowest density (1 out of 11) is sent and the locally generated sine wave is calibrated relative to the received sine wave.

The unipolar spectral density has most of its energy concentrated at low frequencies. Thus the interference is, in effect, low frequency distortion. Also note that in T1 systems, the pulses have a 50% duty cycle. That is the first half of the time slot is +1, −1 or 0, but the second half is always zero.

One such prior art bipolar coded signal testing system is disclosed in U.S. Pat. No. 3,083,270, entitled "Pulse Repeater Marginal Testing System". Here it was explained that the basis of the test signal was a pulse signal of the type normally transmitted over the system. However, this pulse signal did not possess a direct-current component, nor did it possess an additional analog component at a frequency substantially less than the minimum pulse repetition frequency. For the bipolar system a test signal was obtained by superimposing upon a series of bipolar pulses, which were necessary to clock the repeaters, a variable number of unipolar pulses of the same polarity. The variation in the number of the unipolar pulses was used to develop the pulse density requirement for test purposes.

In a second prior art patent, U.S. Pat. No. 3,062,927, entitled "Pulse Repeater Testing Arrangement" unipolar pulses were not used per se. The bipolar pulse pattern consisting of $m$ pulses of one polarity and $n$ pulses of the opposite polarity, $m$ and $n$ being unequal intergers, such that the repetitious patterns have a net direct-current component. The patterns were inverted periodically thereby producing a pulse train having an "identification tone" component at the inversion frequency.

While the repeater test methods disclosed in the prior art permit testing of regenerative repeaters employed in PCM systems which use a bipolar code, the prior art technique is not applicable to a system which uses the modified duobinary code. Therefore, it is a principal object of this invention to provide a test technique which may be employed to locate faulty or inoperative regenerative repeaters for digital systems which use the modified duobinary code.

SUMMARY OF THE INVENTION

Apparatus for testing modified duobinary regenerative repeaters in a serial repeatered line comprises a pulse pattern generator which provides a basic repetitious pattern of pulses characterized by two pulses of one binary state followed by two pulses of the other binary state, followed by two pulses of the one binary state which is then followed by a variable number of time slots without pulses. The pulse density is varied by varying the frequency of occurrence of the pulse pattern. An audio frequency tone is generated by periodically inverting the pulse patterns at the audio frequency rate. The pulse density is used to establish the operational characteristics of the repeater. The audio frequency identifies the location of a particular repeater of the serial string which is being tested. A narrow-band filter at that location selects the audio output signal from the repeater and transmits this audio signal via a voice-frequency return path which is connected to a test instrument.

BRIEF DESCRIPTION OF THE DRAWING(S)

Figure 5:
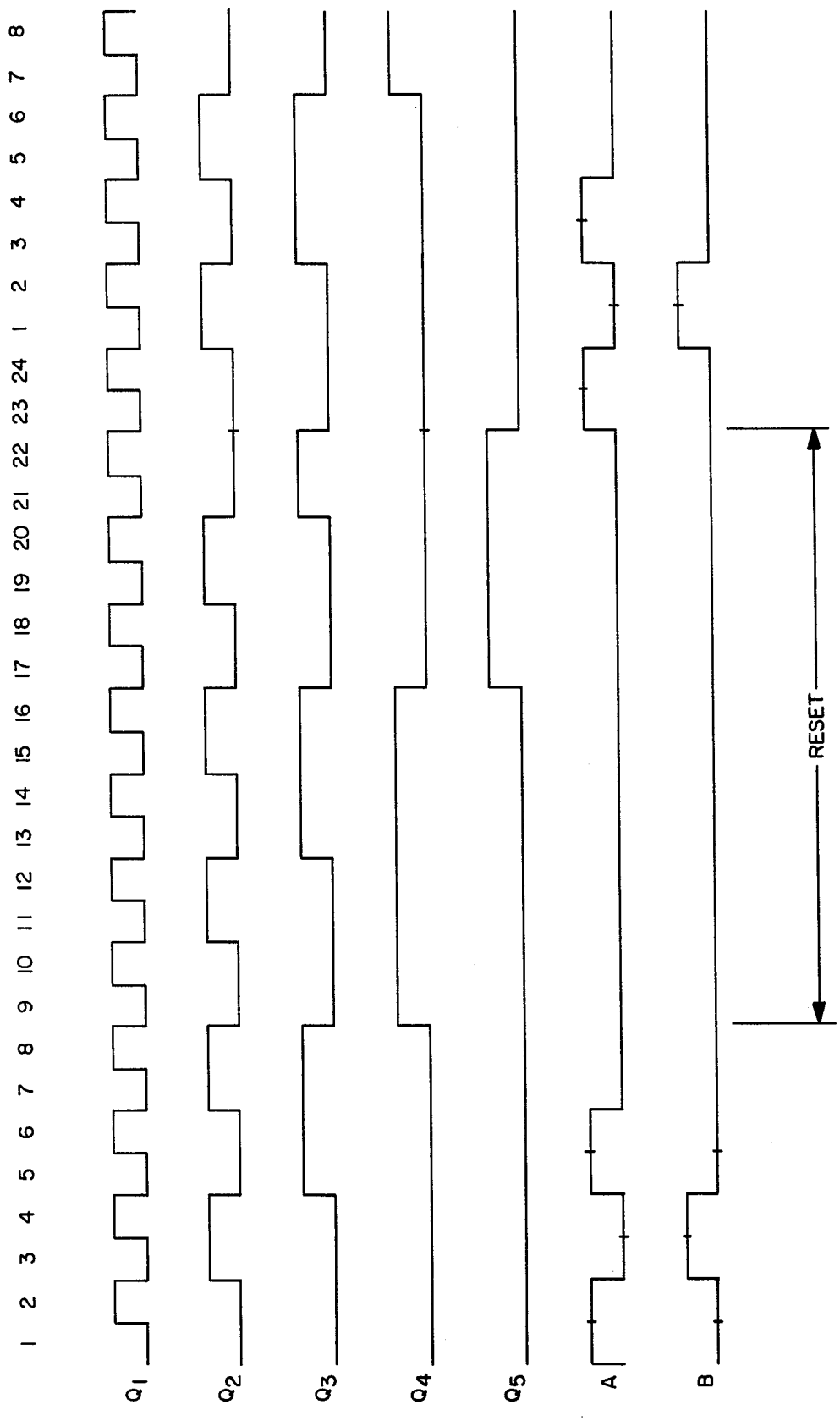

FIG. 5 is a waveform diagram illustrating the cooperation between counter 20 and gates 36 and 38 to generate the basic binary patterns which are used to form the duobinary pulse pattern for transmission.

Figure 6:
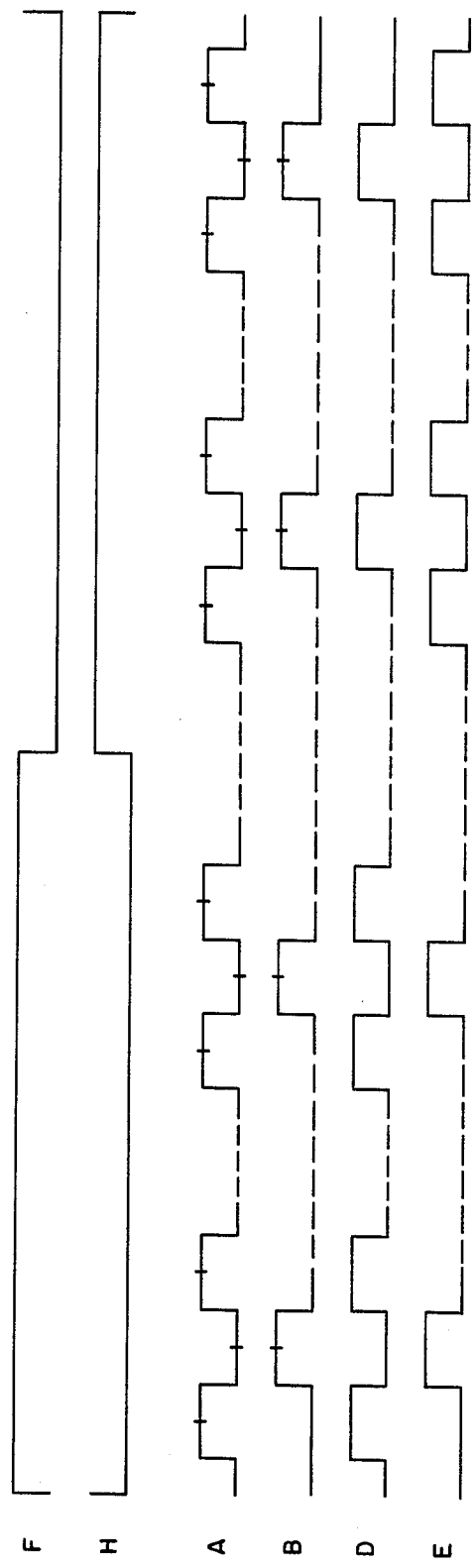
Figure 4:
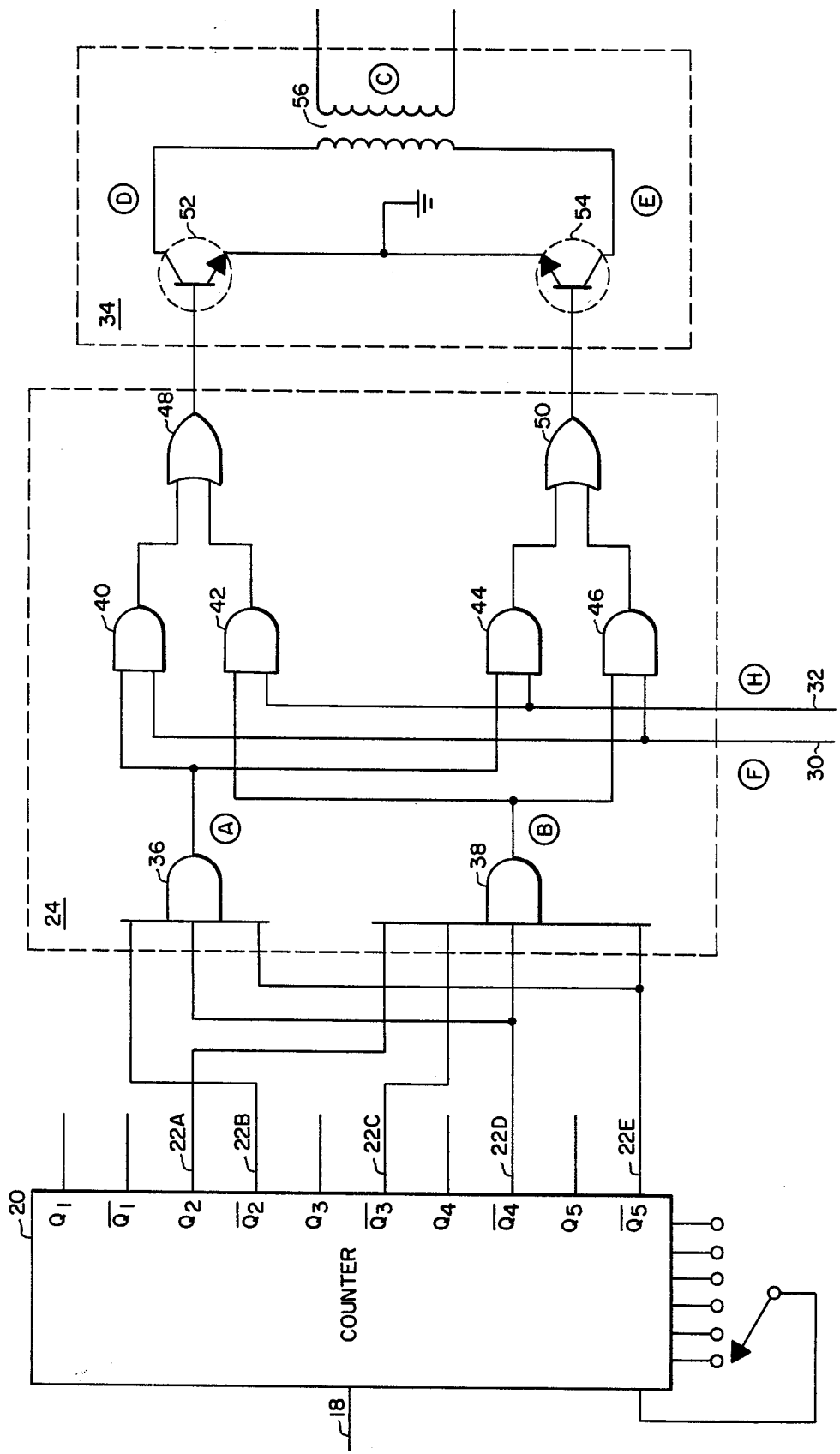
FIG. 4 is a block, logic and schematic diagram illustrating in more detail the logic circit for combining waveforms and inverting the basic pattern at a predetermined audio frequency rate.

FIG. 6 is a waveform diagram illustrating the interaction of the logic circuit of FIG. 4 and the audio frequency inputs for generating the basic modified duobinary pulse pattern used in testing the transmission path of the repeatered line.

DESCRIPTION OF THE PREFERRED EMBODIMENT

Figure 1:
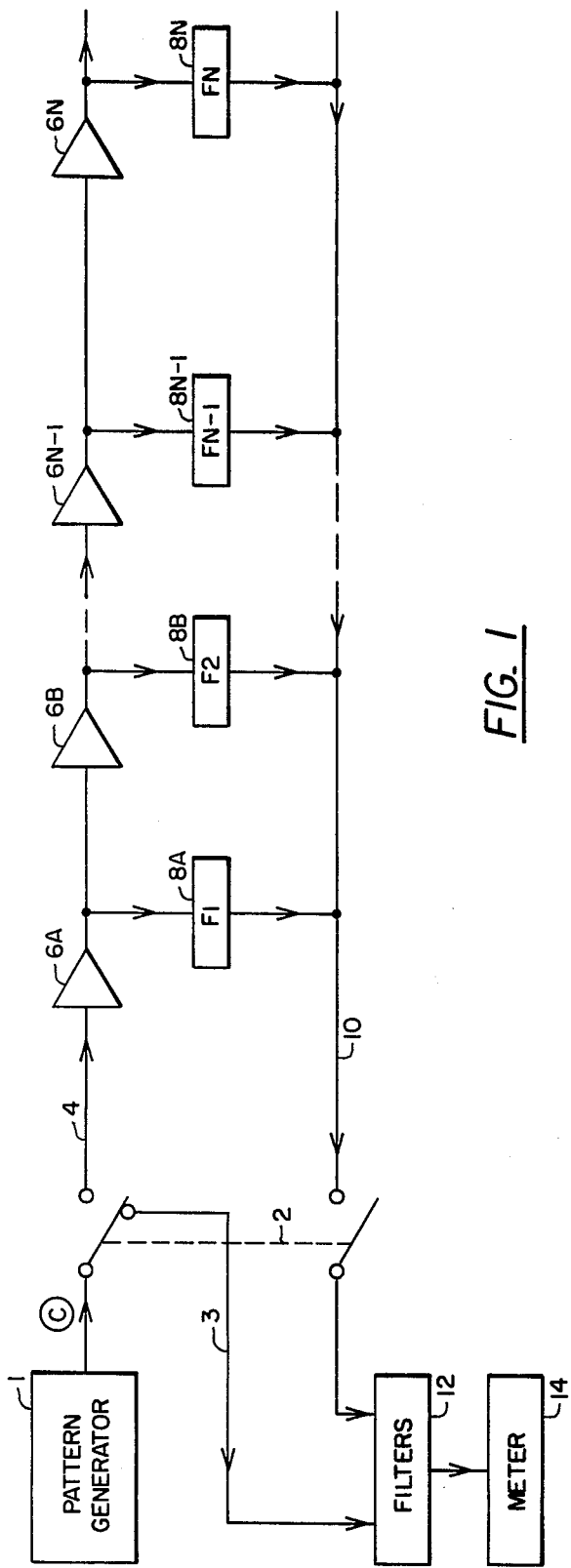
FIG. 1 is a block diagram illustrating the pattern generator, the measuring device, and the interconnection of the pattern generator and measuring device to the repeatered line, and the voice-frequency return path.

Referring now to FIG. 1, it may be seen that the transmission path to be tested consists of a cable 4 and repeaters 6A, 6B, 6N-1 and 6N. The technique for testing the operation of the transmission path and, in particular, the operation of the modified duobinary repeaters, 6, consists of applying the test pattern from pattern generator 1 to the cable path 4 by means of a connection through a switch means 2 such as illustrated in FIG. 1. The test pattern is essentially a filtered sine wave which has an amplitude that is dependent upon the pulse density, i.e., the number of pulse patterns within a specific number of time slots. The following description should facilitate understanding the operation of the testing technique.

Figure 2:
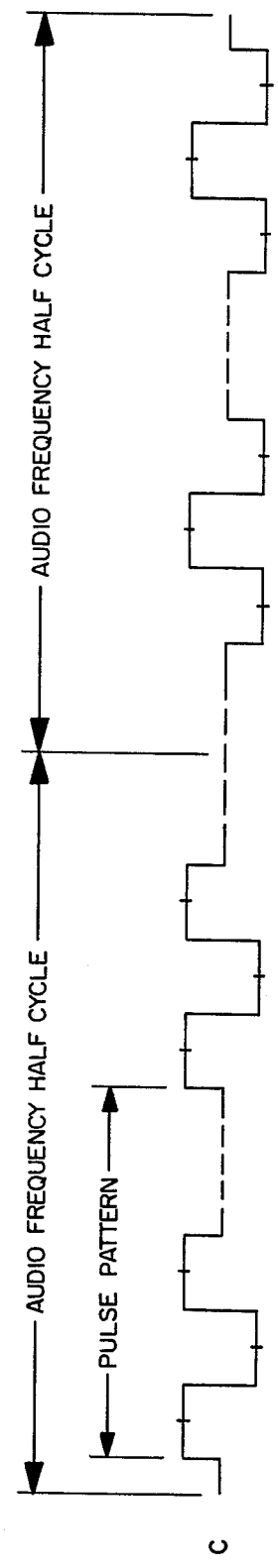
FIG. 2 is a waveform diagram illustrating the preferred pulse pattern used in testing the modified duobinary regenerative repeaters.

The modified duobinary fault-locating pattern consists of six pulses each having a 100% duty cycle, i.e., nonreturn-to-zero pulses. The pattern is shown in FIG. 2 and it may be seen that it follows the pattern ++−−++. We can regard this pattern as a modified duobinary sextuplet, and compare it with the bipolar triplet previously described. If we do so, then compatibility of the modified duobinary with the fault-locating procedures for bipolar becomes apparent. Thus, the sextuplet may be regarded as the sum of a modified duobinary and a unipolar pulse train as follows:

Duobinary: ++−−00000++−−00000++−−
Unipolar: 0000++0000000++0000000
Special Signal:
++−−++000++−−++000++−−

The special signal includes the pulse sequence ++000++ on a repetitive basis. This pulse sequence is a violation of the modified duobinary coding rules since the modified duobinary permits only two pulses of the same polarity to occur without a change.

In the preferred embodiment, the lowest density of sextuplets is 6 out of 22 time slots or, equivalently, 2 unipolar pulses out of 22 time slots. The maximum density is 6 out of 8 time slots or, equivalently, 2 unipolar pulses out of 8 time slots. Again, the periodic pulse train is switched at the audio frequency rate corresponding to the repeater and audio filter location. For each repeater, the test starts with the lowest density, 6 out of 22, so that the low frequency interference of the unipolar pulse train is negligible and an operative repeater will usually reproduce pulses without errors. At the same time, the sine wave output, from the locally-generated fault-locating set, is calibrated against the signal received via the v-f path from the repeater. Gradually the pulse density is increased. At some point, the repeater will cause errors in the regenerated pulse train and the amplitude of the received sine wave will decrease. When the difference between the locally-generated and calibrated sine wave and the received sine wave exceeds a predetermined value, the corresponding pulse density indicates the repeater margin. First the nearest repeater in the direction of transmission is tested and so down the line.

The inversion rate sets the selection for the bandpass filters F1, F2, FN-1, and FN which identify the repeater site location. It is well known that at any one of the particular repeater sites a number of repeaters may be installed for use between the same basic transmission paths. The audio-frequency output signal which is selected, for example, by bandpass filter 8A is applied to voice frequency path 10 for return to the measurement portion of the testing system. This return path 10, may be provided with "loading coils" for improved low-frequency transmission. Voice-frequency amplifiers may also be employed if the attenuation of the line is such that the received amplitude signal would not provide an adequate level for a determinative test. The use of "loading cells" and voice frequency amplifiers in voice-frequency transmission is well-known. At the test terminal the signal is again filtered to eliminate any spurious information which may have been picked up on the return path. While the pattern generator and the measurement portion of the testing arrangement are shown separately, it is readily apparent that they may be included in a single test set. This test set could include the switch 2 shown in FIG. 1, which is used to provide the necessary connections to the repeatered line and to the voice-frequency transmission path as sell as the internal calibration connection between the pattern generator and the measurement portion of the test set. Further, a switching arrangement would be necessary in order to select the desired audio frequency filter. Such switching arrangements are well known and are not shown in the drawings. Since the test signal to be measured is an audio frequency signal an *a-c* meter would be employed.

Figure 3:
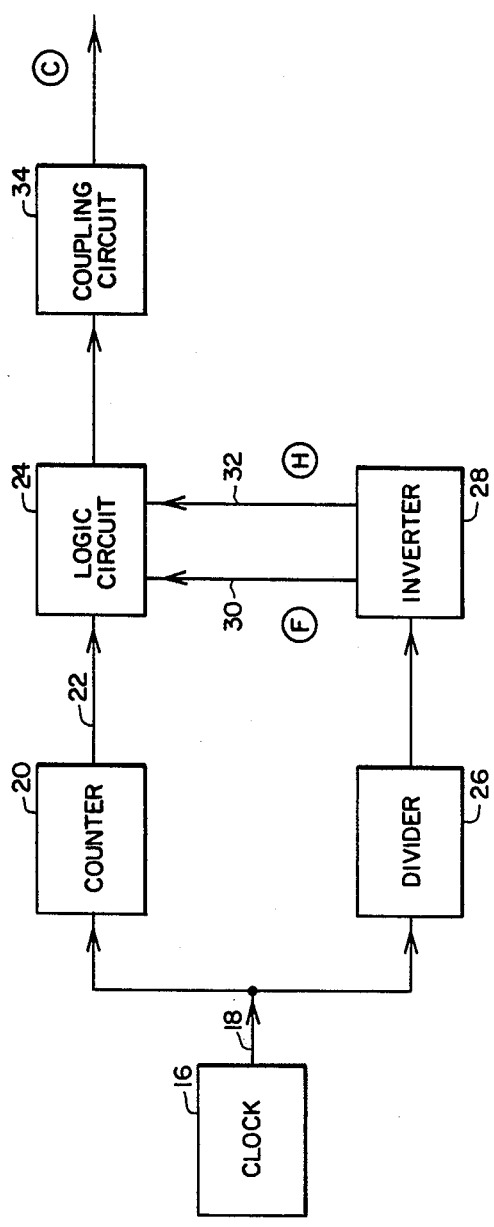
FIG. 3 is a block diagram of the pattern generator illustrated in FIG. 1.

Referring now to FIG. 3, it is seen that the pulse pattern generator consists of a master clock 16 which operates at the bit rate for the transmission path. In the example of the preferred embodiment of the invention, the master clock is operating at 3.152 MHz which corresponds to a bit rate of 3.152 Mbits/sec. Also, the density of the pulse pattern, is varied by varying the total number of time slots associated with one pulse pattern, i.e., one sextuplet. In the preferred embodiment, the density varies from one sextuplet per eight up to 22 time slots. The output of the master oscillator is applied to both the counter 20 and divider 26. Counter 20 is a variable reset with feedback counter providing a scale of 8–22 counter so as to select, within the range, the number of time slots in which the pulse pattern would occur. This feature is shown schematically by the switch connected to counter 20, FIG. 4. Counter 20 may be a variable modulus counter such as described in the text "Digital Electronics for Scientists", Malmstadt and Enke, W. A. Benjamin, Inc., New York, 1969, pgs. 260–264.

The master clock output is also applied to divider 26 via path 18. Divider 26 is a programmable 12-stage binary counter with variable feedback reset. Such dividers are well known and will not be described here. With 12 stages it can be seen that one can divide by a maximum number of $2^{12}$ which, in this example, provides an output wherein the original frequency or rate is divided by 4,096. Because of variable feedback reset any number can be selected on the switches, but the number cannot exceed the maximum which is the 4,096. The purpose of the programmable 12-stage binary counter is to generate a series of audio frequencies using a variable reset feedback switch. For example, as shown in FIG. 3, assuming that 832 Hz is the lowest audio frequency contemplated to be used and 3,017 Hz is the highest, the extreme numbers selected on the switch are 3,788 and 1,045. Here 3.152 MHz is divided by 3,788 which produces a frequency of 832.10137 Hz, which is close enough to 832 Hz for all practical purposes. Similarly, the frequency 3.152 MHz is divided by 1,045 and produces an output frequency of 3,016.2679 Hz which is also close enough to the 3,017 Hz frequency desired. The in-between frequencies are produced in a similar manner by selecting appropriate switch positions. Thus, the output of the programmable 12-stage counter is an audio frequency in the square waveform which is applied to inverter 28. The divided frequency may be applied directly as F on path 30 to logic circuit 24 or in inverted form H on path 32. Waveforms F and H, FIG. 6, illustrate the square wave outputs on paths 30 and 32 from inverter 28. Logic circuit 24 converts the counter input on path 22 into waveforms representing the sextuplet pattern which are then combined in coupling circuit 34 for the presentation of the upright or inverted pulse pattern used for testing the transmission path. This is illustrated in more detail in FIG. 4.

Referring now to FIG. 4, it is to be seen that counter 20 accepts an output from master clock 16 on path 18 and provides two different outputs. One output is the variable reset which is used for programming the number of time slots associated with each sextuplet of the pulse pattern, and the other is the ten outputs of five binary dividers — one for each $Q_i$, $\overline{Q}_i$, where *i* is equal to 1–5. The function of the scale of 8 to 22 counter is to generate sextuplets in 8 up to 22 time slots. The way in which this is accomplished may be understood by referring to FIG. 4 and waveform diagram FIG. 5 and by the fact that the output from gate 36, indicated as A in FIG. 4, is equal to $\overline{Q}_2$, $\overline{Q}_4$, $\overline{Q}_5$, and this output provides, for example, two positive pulses in slots 1 and 2, and 5 and 6 of the sextuplet. Assuming that F in FIG. 4 is high, gate 36 will have an output through AND gate 40 and OR gate 48. The output of OR gate 48, via transistor 52, provides waveform D which is illustrated in FIG. 6. Waveform D is applied to transformer 56 and will provide two positive pulses in time slots 1 and 2 which would be applied to the transmission path. As noted hereinabove, the audio frequency signals F and H vary at an audio rate and $F = \overline{H}$ or $H = \overline{F}$. This is also illustrated in FIG. 6 waveforms F and H. Thus, if F is high it enables AND gates 40 and 46; and, if H is low it inhibits the AND gates to which it is connected, i.e., gates 42 and 44. Consequently, either gates 40 and 46 are active (enabled) and gates 42 and 44 are inhibited or vice versa. A switching function is thus performed by the two sets of gates under control of the divided output signals — upright and inverted.

In the above analysis, we have assumed that F is high. When the A output is passed through gate 40, gate 38 has no output, B, since $B = Q_2 \overline{Q}_3 \overline{Q}_4 \overline{Q}_5$. However, in time slots 3 and 4, it may be seen from FIG. 5 that gate 38 has an output, B, but gate 36 does not have an output, A. But note that F is still high. Thus, the output for the time slots 3 and 4 is waveform B which is applied via AND gate 46, OR gate 50 and transistor 54 to become waveform E at the input to transformer 56. Thus, the positive output of OR gate 50 is inverted by the transformer to produce negative pulses in time slots 3 and 4 for coupling to the transmission line. Finally, in time slots 5 and 6, we again have no output from gate 38, but there is an output from gate 36, and F is still high resulting in the application of positive pulses at D to coupling circuit 34, which, in turn, are applied to the transmission path via transformer 56. Thus, the sextuplet is created.

For the remaining time slots (8–22) as illustrated in FIG. 5, the variable reset feedback resets the waveform to a zero state as shown. Since F and H alternate at an audio rate, when H is high and F is low, in time slots 1, 2, 5 and 6 AND gate 44 passes the A output from gate 36 which becomes negative (negative pulses) at the output of transistor 54. However, during time slots 3 and 4, with H high, AND gate 38 has an output on B which is high and passes through AND gate 42 to produce the positive pulses at the output of transistor 52. Thus, the sextuplet pattern alternates at the selected audio rate.

While the invention has been particularly shown and described with reference to a preferred embodiment thereof, it will be understood by those skilled in the art that change in form and detail may be made therein without departing from the spirit and scope of the invention.

What is claimed is:

1. An arrangement for remotely testing, from a test location, the transmission characteristics of modified duobinary regenerative repeaters in situ in a repeatered line, said remote testing arrangement comprising:
   means for generating a modified duobinary pulse test pattern composed of repetitious patterns of pulses, each said test pattern characterized by the presence of two pulses of one state followed by two pulses of the opposite state, which is followed by two pulses of said one state, said generating means comprising:
  means to vary the repetition rate of said test patterns, thereby changing the pulse density, and means to invert the polarity of the pulses in the pattern at any one of a number of predetermined rates, thereby generating one of a number of predetermined audio frequencies, one said predetermined audio frequency for each repeater location, said generating means having an output;
  means for transmitting the predetermined audio frequency from the output of a repeater to said test location, said transmitting means having an output;
  means for measuring the amplitude of the predetermined audio frequency, said measuring means having an input; and
  means for selectively and simultaneously connecting the output of said pulse pattern generator to said repeatered line and said transmitting means to the input of said measuring means, and for selectively and simultaneously connecting the output of said pulse pattern generator to the input of said measuring means and disconnecting said transmitting means therefrom.

2. The arrangement of claim 1 wherein said means for generating further comprises:
  timing means;
  counting means having one input connected to the timing means, having a programmable second input so as to obtain a variation in the pattern density as desired, and having a plurality of outputs;
  dividing means having one input connected to the timing means, having a programmable input so as to obtain specified divisions of the timing frequency, and having an output;
  inverting means having an input connected to the output of the dividing means, having as a first output the input frequency and as a second output the output of said inverting means;
  logic means having a plurality of inputs connected to outputs of said counting means, having inputs connected to the outputs of said inverting means, and having an output; and
  coupling means having an input connected to the output of said logic means and having an output.

3. The arrangement of claim 2 wherein said measuring means further comprises:
  means for selecting said predetermined audio frequency from said transmitting means having an input, and having an output; and
  an a-c meter having an input connected to the output of said selecting means, said meter providing an amplitude indication.

4. The arrangement of claim 3 wherein said selecting means further comprises:
  a plurality of filters, one corresponding to each repeater location.

5. The arrangement of claim 4 wherein said logic means further comprises:
  a first gating means having an output, having a plurality of inputs connected to first selected outputs of said counting means and said first gating means providing the first, second, fifth and sixth pulses of said repetitious patterns;
  a second gating means having an output, having a plurality of inputs connected to second selected outputs of said counting means, and said second gating means providing the third and fourth pulses of said repetitious patterns; and
  switching means having a first input connected to the output of said first gating means, having a second input connected to the output of said second gating means, having a third input connected to the upright output of said inverting means, having a fourth input connected to the inverted output of said inverting means, and having first and second outputs.

6. The arrangement of claim 5 wherein said coupling means further comprises:
  a first transistor having a base, emitter and collector, said base being connected to the first output of said switching means and said emitter connected to ground;
  a second transistor having a base, emitter and collector, said base being connected to the second output of said switching means and said emitter connected to ground; and
  a transformer having a primary and a secondary winding, one end of the primary winding being connected to the collector of said first transistor and the other end of said primary winding being connected to the collector of said second transistor, said secondary winding providing the output test pattern of said generator.

7. In an arrangement for testing the transmission characteristics of modified duobinary regenerative repeaters in situ in a repeatered line, means to generate a modified duobinary pulse test pattern which comprises:
  timing means;
  counting means having an input connected to the timing means, having a programmable second input, and having a plurality of outputs;
  alternating means having an input connected to said timing means and having a first output providing a first binary signal at any one of a number of predetermined rates, and having a second output providing a second binary signal which is of the opposite phase from said first binary signal;
  logic means having a first input connected to an output of said counting means, having a second input connected to the first output of said alternating means and having a third input connected to the second output of said alternating means, and having an output; and
  coupling means having an input connected to the output of said logic means and having an output.

8. The arrangement of claim 7 wherein said means to alternate further comprises:
  dividing means having one input connected to the timing means, having a programmable input so as to obtain specified divisions of the timing frequency, and having an output; and
  inverting means having an input connected to the output of the dividing means, having as a first output the input frequency and as a second output the output of said inverting means.

9. The arrangement of claim 8 wherein said logic means further comprises:
  a first gating means having a plurality of inputs connected to first selected outputs of said counting means, said first gating means providing the first, second, fifth and sixth pulses of the test pattern;
  a second gating means having a plurality of inputs connected to second selected outputs of said counting means, said second gating means providing the third and fourth pulses of the test pattern; and switching means having a first input connected to the output of said first gating means, having a second input connected to the output of said second gating means, having a third input connected to the upright output of said inverting means, having a fourth input connected to the inverted output of said inverting means and having first and second outputs.

10. The arrangement of claim 9 wherein said coupling means further comprises:

a first transistor having a base, emitter and collector, said base being connected to the first output of said switching means and said emitter connected to ground;

a second transistor having a base, emitter and collector, said base being connected to the second output of said switching means and said emitter connected to ground; and a transformer having a primary and a secondary winding, one end of the primary winding being connected to the collector of said first transistor and the other end of said primary winding being connected to the collector of said second transistor, said secondary winding providing the output test pattern of said generator.

* * * * *